(No Model.)   4 Sheets—Sheet 1.
L. S. CHICHESTER.
WATER RENOVATOR.

No. 417,703. Patented Dec. 24, 1889.

WITNESSES: INVENTOR:
Alfred Gartner  Lewis S. Chichester,
E. L. Shuman  BY Draker Co. ATTY'S.

(No Model.) 4 Sheets—Sheet 2.

L. S. CHICHESTER.
WATER RENOVATOR.

No. 417,703. Patented Dec. 24, 1889.

WITNESSES: INVENTOR:

Lewis S. Chichester,
BY Drake & Co ATTY'S.

(No Model.) 4 Sheets—Sheet 3.

L. S. CHICHESTER.
WATER RENOVATOR.

No. 417,703. Patented Dec. 24, 1889.

WITNESSES: INVENTOR
Alfred Gartner
E. L. Sherman
Lewis S. Chichester,
BY Drake ATTY'S.

(No Model.) 4 Sheets—Sheet 4.
L. S. CHICHESTER.
WATER RENOVATOR.

No. 417,703. Patented Dec. 24, 1889.

WITNESSES: INVENTOR:
Alfred Gartner
E. L. Sherman

Lewis S. Chichester,
BY Drake & Co ATTY'S.

UNITED STATES PATENT OFFICE.

LEWIS S. CHICHESTER, OF NEWARK, NEW JERSEY, ASSIGNOR TO CARROL P. BASSETT, OF SAME PLACE.

WATER-RENOVATOR.

SPECIFICATION forming part of Letters Patent No. 417,703, dated December 24, 1889.

Application filed January 14, 1889. Serial No. 296,251. (No model.)

*To all whom it may concern:*

Be it known that I, LEWIS S. CHICHESTER, a citizen of the United States, residing at Newark, in the county of Essex and State of New Jersey, have invented certain new and useful Improvements in Water-Renovators; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The object of this invention is to reduce the cost of construction; to secure a more perfect filtration and aeration of the water; to reduce the power required to impel the water, by suction or otherwise, quickly and copiously through the filtering medium; to enable the said filtering medium to be rapidly and conveniently cleaned; to secure a more uniformly diffused water-course through the said medium, such as will allow the transmission of the water freely, and yet in such disseminate particles or films as to secure a thorough filtration, and to give other advantageous results, as will be hereinafter referred to.

The invention consists in the improved filtering and aerating device, and in the constructions and arrangements of parts, substantially as will be hereinafter set forth, and finally embraced in the clauses of the claim.

Figure 1:
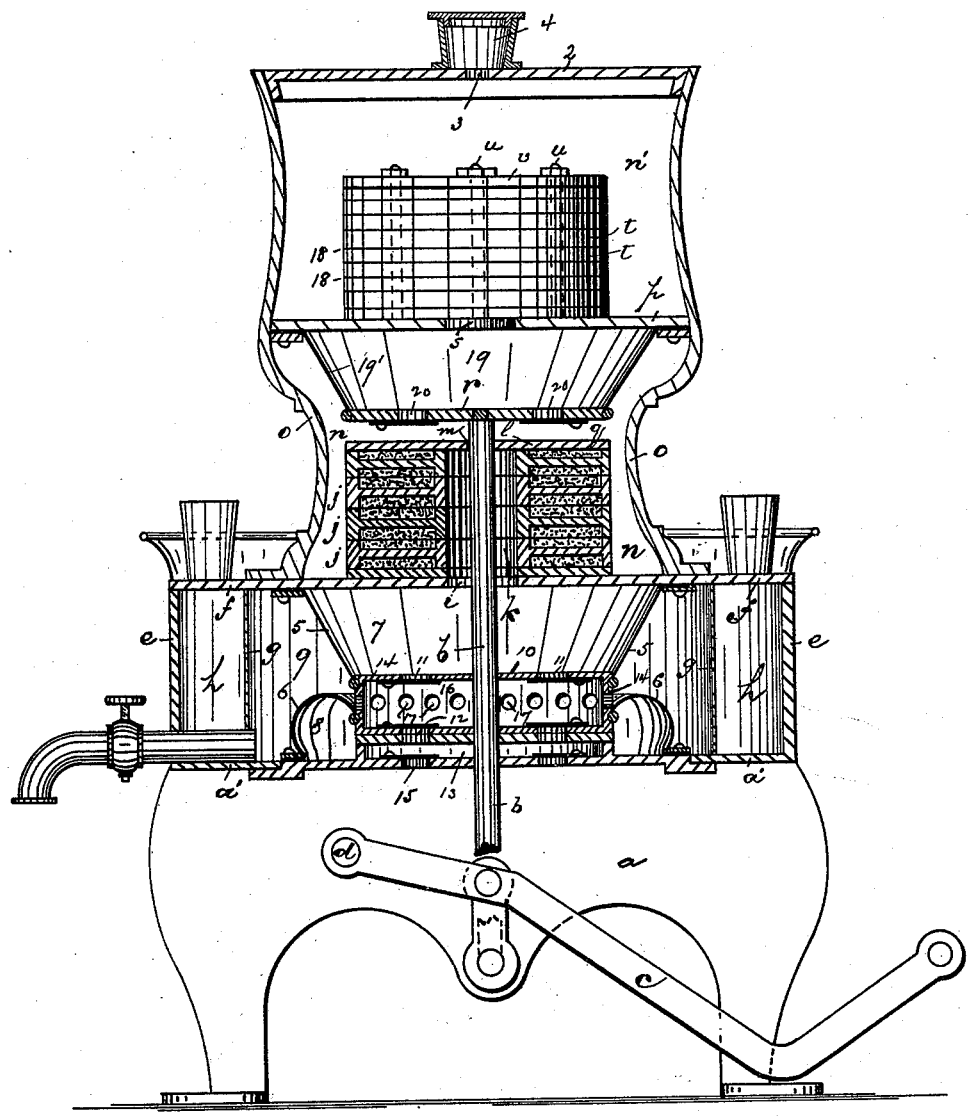
Figure 2:
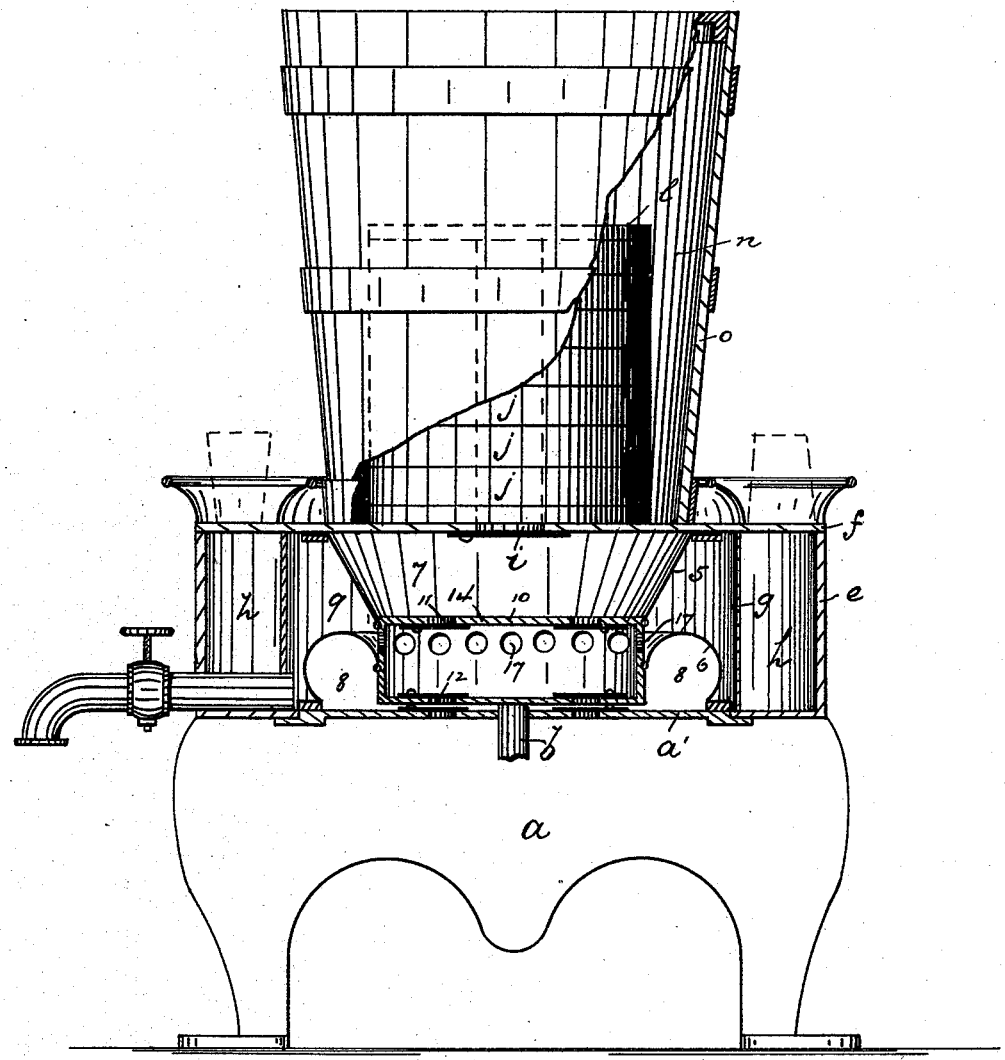
Figure 3:
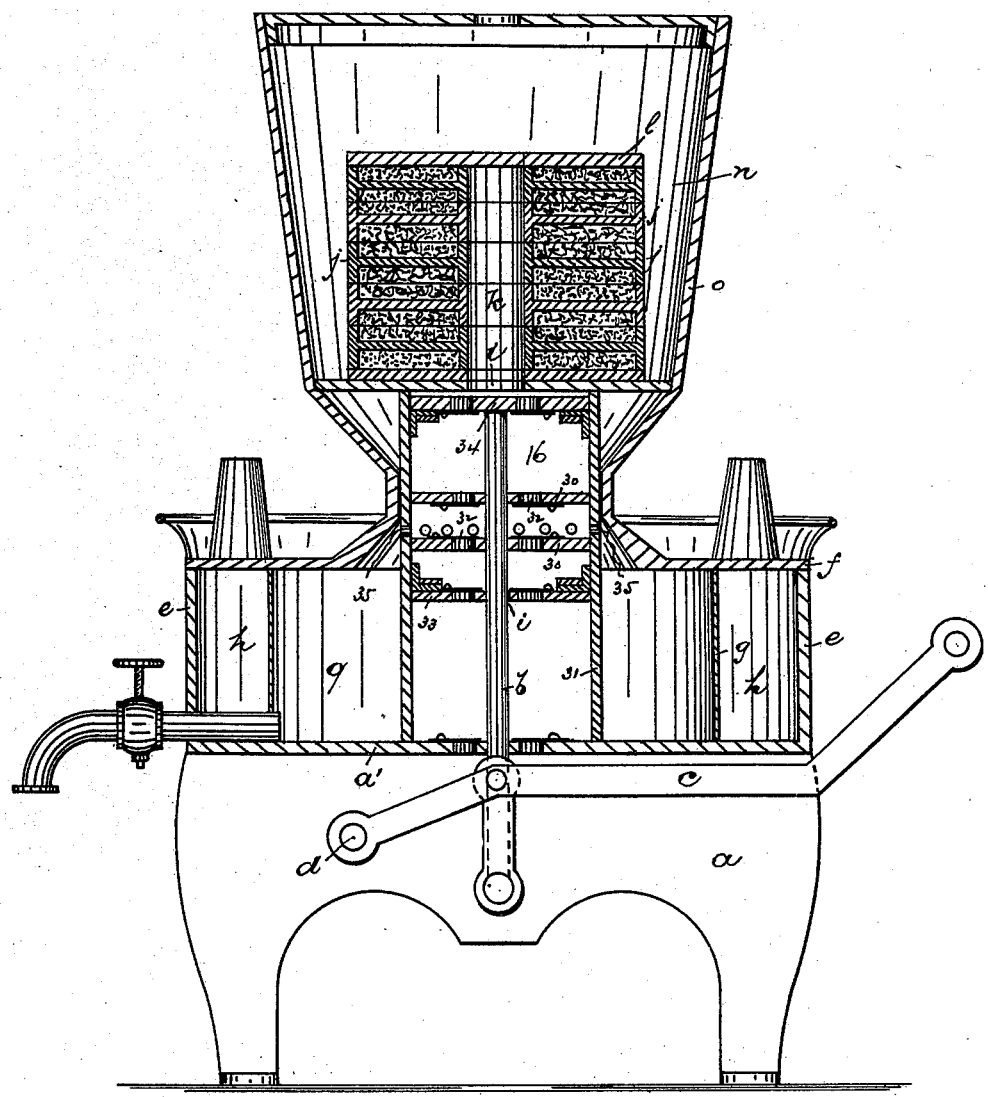
Figure 4:
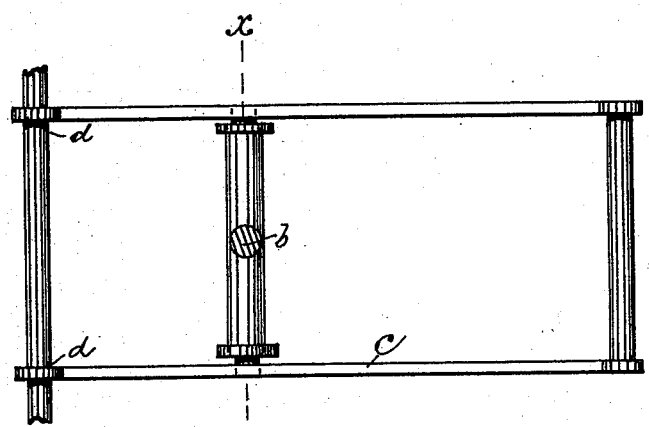
Figure 5:
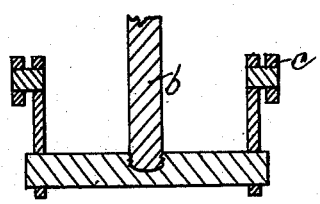
Figure 6:
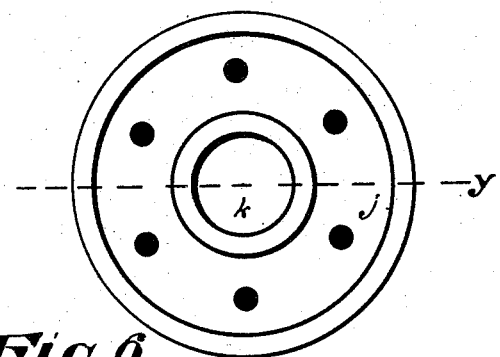
Figure 8:
Figure 9:
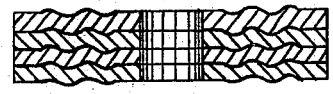
Figure 7:
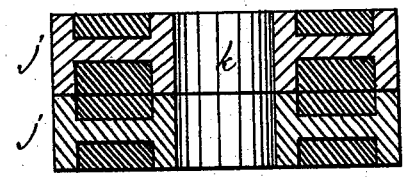

Referring to the accompanying drawings, in which like letters of reference indicate corresponding parts in each of the several figures, Figure 1 is a central vertical section of the improved filter, showing the preferred construction of the same. Fig. 2 is a similar section illustrating a variety of the improved device. Fig. 3 is a section showing still another variety, which I may employ under certain circumstances or conditions. Figs. 4 and 5 are detail views of a lever adapted to reciprocate a certain piston-rod and suction-head, Fig. 5 being a section through line *x*. Fig. 6 is a plan of a filtering disk or plate; and Fig. 7 is a section on line *y*, showing two of said disks together, this variety of disk or plate showing a concavity or chamber for bone or other loose charcoal or other chemical or filtering material for treating peculiar waters. Figs. 8 and 9 show plates or disks devoid of such recesses, chambers, or concavities, and thus presenting wider surfaces and allowing of greater thinness, whereby a greater number of plates may be arranged in a stack of a given depth.

In said drawings, *a* indicates a suitable bed or stand having a perforated plate *a'*, to allow a piston-rod *b*, connected with a handled lever *c*, suitably fulcrumed, as at *d*, on said bed, to extend upward through the said perforated plate and operate certain suction devices arranged in chambers *s*, formed above said plate. The chambers are formed by partitions and walls of metal, pottery, or other suitable materials, the preferred arrangement of the partitions and inclosing-walls being shown in Fig. 1, where *e* indicates an upwardly-extending outer wall formed integral with the plate *a*, on which is seated a plate *f*.

Within the chamber formed by the wall *e* is arranged a partition *g*, which forms with the outer wall *e* and the plates *a* and *f* and outer ice-chamber *h* an inner chamber, which is in the preferred construction again divided to form other chambers, which will be referred to.

The plate *f* is perforated, as at *i*, to allow a passage to the piston-rod *b* and the downflow of filtered water, and above said plate *f* is arranged a series or stack of filtering-plates *j*, having a central passage *k*, coinciding with the perforation *i*. The said passage *k* is closed and the stack of filtering-plates is covered by a plate *l*, which is or may be perforated, as at *m*, to allow for the further extension upward of the piston-rod *b*.

Around the filtering-plate *j* is an unfiltered-water chamber *n*, formed by a vessel *o*, seated on the plate *f*, which said cylindrical vessel extends upward considerably above the stack of the filtering-plates *j*, and is horizontally partitioned, as at *p*, to divide the said unfiltered-water chamber into two. Between the said horizontal partition *p* and the tops of the cover *l* is formed a space *q*, in which, when a second upper filter is employed, a head *r* of the piston reciprocates under the influence of the said rod. The partition $p$ is provided with a water-passage $s$, and above the same is stationed another stack of filtering-plates $t$, having a central water-passage and cover $v$, similar to those of the stack $j$.

The filtering-plates are arranged in the subdivision $n'$ of the unfiltered-water chamber, and are clamped and held in place by bolts $u$, which extend through the cover $v$, filtering-plates $t\ t$, and partitions $p$, as indicated, so that the said plates are brought into very intimate relation to one another, through the joints of which the water may flow; but the sediment or mechanical impurities suspended in the water will be caught in the joints, as will be hereinafter described.

The chamber $n'$ is covered by a removable cover 2, which may be supplied with an air-vent 3 and a coagulant-receptacle 4.

Below the plate $f$, on the piston-rod $b$, is secured a reciprocating box or suction-head 14, which is connected with both the plate $f$ and plate $a$ by flexible partitions 5 6. These subdivide the chambers within the partition $g$ into chambers 7, 8, and 9, the first of which receives the filtered water from the passage $k$ as the said box or head 14 descends with the piston. The top plate 10 of the box, which forms the bottom of the chamber 7, is provided with valved openings 11 11, through which the water on the upward stroke of the box passes into the box, where it is caused to mingle with air introduced to said box in its downward stroke through port-holes or valves 12, opening to said box from air-chambers 13 and 8. The said air-chambers 13 are in open communication with the said chamber 8, which latter is formed by the lower of the flexible partitions 6, by which the box is connected with the adjacent fixture $a$. Said air-chamber 13 has a connection with the open air through valved openings 15.

In the upward movement of the piston-rod and the box thereon the air is drawn into the chamber 13. In the next return movement this air is forced into the chamber 16 in said box, and from thence said air is forced outward, together with the filtered water in said box, through perforations 17, formed around the sides of said box, into the filtered-water chamber 9, from whence it may be drawn off, after cooling, through the faucet 18.

It will be observed that in the preferred construction (illustrated by Fig. 1) I filter the water twice, the water, under the force of suction induced by the descending head $r$, passing from the chamber $n'$, through the joints 18 in the filtering media, to the chamber 19, formed by a flexible partition 19', and from thence, on the return of the piston-head, passing through the valved openings 20 in said head to the second water-chamber $n$, having the stack of filtering-plates $j\ j$. The suction of the descending head or box 14 then draws said water through the second stack of filtering material and brings it into intimate contact with air. Thus the said water is very thoroughly filtered and cleared of minute impurities.

By the arrangement of devices for aerating the water described the water is broken into particles and thoroughly commingled with air, and, as a result, organic matter is oxygenated and voided of noxious qualities.

The filtering media which I prefer to employ consist of thin slats, plates, or disks of carbon pressed into the requisite shape and arranged together in a series, the rough surfaces being placed face to face, so that a series of joints are formed penetrable by water, but sufficiently close to prevent the transmission of substances suspended in the water. By providing a large number of such plates and a corresponding number of joints the water will find a comparatively free course through the filtering-stack, and yet not such an open course as will allow the passage of the said suspended matter.

The rough granular surfaces of the carbon plates, pressing one another, as described, present a uniformly close water-way, so that the water is distributed over a large surface, and will not, as heretofore, find an unduly free passage through certain parts of the carbon and be entirely prevented from passing through other large masses, as will be understood.

By means of the bolts the plates are pressed together with uniform closeness, there being sufficient elasticity to the plates to allow of their coming closely together under pressure.

I may make the plates hollow between the outer and inner edges, as exhibited in Figs. 1 and 7, and in the chambers formed thereby I may insert a fine filling of charcoal or other media, through which the water may filter; but when only one stack is employed I prefer the construction shown in Figs. 8 and 9.

Instead of forming the plates flat, as in Fig. 8, the said plates may be corrugated, irregular, or wavy, as in Fig. 9, and thus the area of filtering-surface be increased.

When the plates are made hollow I employ bone-charcoal to soften the water, or other chemicals may be employed to give other qualities or to remove objections to particular waters.

By loosening the screws of the bolts the plates may be separated to allow of flushing with water or steam, or to allow of complete removal from the filter.

The plates are preferably made of carbon, pressed into the desired shape, and then subjected to a high heat, and thus brought to a condition of peculiar value for the desired purpose.

While I particularly wish to lay claim to the use of carbon plates, under some conditions I may employ plates or laminæ of other materials.

I am aware that many changes or varieties of construction may be made in the filter without departing from the pith, spirit, or scope of the invention, and consequently I do not wish to be understood as limiting myself to any one exact arrangement. For example, I may dispense with the flexible partitions and employ a cylinder and piston, as in Fig. 3, where 30 30 are stationary partitions arranged in the cylinder 31 and having valves 32 32, and 33 34 are piston-heads movable with the piston-rod, and adapted, respectively, to force water and air into contact and press them together into the filtered-water chamber lying laterally adjacent, through openings 35.

I am aware that the filtering operation has been facilitated by means of an air or suction pump, and also that very porous bricks or tiles—such as are made by mixing clay and sawdust and afterward burning out the sawdust—have been employed in filtering. These features I do not herein claim, broadly. The filtering medium that I prefer to employ and do employ in the construction illustrated consists of plates which themselves are practically impervious to water, or are so compact in structure as to prevent the water from passing therethrough and carrying with it the impurities. In the collection of plates of my invention the water passes between the plates, flowing over the rough surfaces and depositing the impurities thereon, where it may be readily removed without detriment to the plate and not sinking into and depositing the impure matter within the plates, where it must remain. My stack of plates thus allows what I term "surface filtration" only.

Having thus described the invention, what I claim as new, and desire to secure by Letters Patent, is—

1. In a filter, the combination, with a receptacle having a filtered-water chamber, an unfiltered-water chamber, and a series of impervious plates arranged together to form filtering-joints between, of a suction-head adapted to draw the water through said joints by suction, substantially as and for the purposes set forth.

2. In a filter, the combination, with a receptacle having a filtered-water chamber, an unfiltered-water chamber, and a filtering medium therein, consisting of plates of compressed carbon, provided with rough surfaces placed together to allow of surface filtration, of a suction-head, a rod connecting with the same, and a hand-lever adapted to give reciprocating motion to said rod and head, substantially as and for the purposes set forth.

3. In a filter, the combination, with a receptacle having a filtered-water chamber, an unfiltered-water chamber, and an air-chamber, and a collection of practically impervious plates placed face to face and forming filtering-joints, through which the water may flow over the surface of said plates, of a reciprocating suction-head having valves and air-openings therein for sucking the water through said joints and commingling the same with the atmospheric air from said air-chamber after filtration, substantially as and for the purposes set forth.

4. In combination, in a filter, a receptacle partitioned interiorly to provide chambers for the filtered and unfiltered water, and a filtering medium consisting of a series of compressed-carbon plates placed face to face to form close joints through which the water may flow, substantially as and for the purposes set forth.

5. In a filter, the combination, with a filtering-stack consisting of a series of separable plates of compressed carbon placed face to face, of a reciprocating suction-head arranged and adapted to operate substantially as and for the purposes set forth.

6. In a filter, the combination, with a filtering-stack consisting of a series of practically impervious plates having roughened surfaces, of a suction-head for drawing water through joints between said plates, substantially as and for the purposes set forth.

7. In a filter, the combination, with a filtering-stack consisting of a series of plates or laminæ, of a suitable head having valves through which the filtered water may pass, valves through which air may pass, and openings 17 17, through which the water and air may be forced together into the filtered-water chamber, substantially as and for the purposes set forth.

8. In a filter, a filtering medium consisting of a stack of impervious plates having rough surfaces, said plates being arranged face to face and forming filtering-joints, substantially as set forth.

9. In a filter, a filtering-stack consisting of a series of filter-plates placed face to face, and having therein receptacles filled with material differing from said plates in quality, substantially as and for the purposes set forth.

10. In a filter, a filtering-stack consisting of a series of impervious plates placed face to face to form filtering-joints and provided with a central water-passage K, a cover for said stack, and means, substantially as described, for holding said plates together, said parts being arranged and combined substantially as and for the purposes set forth.

11. In a filter, a filtering-stack consisting of a series of plates having roughened surfaces placed face to face, having a central water-passage $k$, and a recess or chamber filled with charcoal formed between said plates, substantially as and for the purposes set forth.

12. In a filter, the combination of the stand $a$, having plates $a'$ and a partition $e$, a plate $f$, perforated as at $i$, a filtering-stack arranged above said plate, a reciprocating box 14, having air-valves and water-valves, flexible partitions forming chambers 7, 8, and 9, and openings 17, all said parts being arranged and adapted to operate substantially as set forth.

13. The improved filter herein described for twice filtering the water, combining filtering-stacks $t\ t$ and $j\ j$, arranged in chambers $n'\ n$, suction-heads $r$ and 14, arranged on piston-rod $b$, and a lever for reciprocating said rod, substantially as described.

14. The improved filter herein described, combining with the stand $a$, and partitions and plates $a'\ e\ g\ 5\ 6\ f$, forming chambers $h$, and an interior chamber, a box 14, arranged in said interior chamber on a piston and connected with the walls of said interior chamber by flexible partitions which subdivide the space into chambers 7, 8, and 9, the said box having valves and openings to receive water and air and emit the same, a cylinder $o$ above the plate $f$ and communicating with the chamber 7, and a filter, all said parts being arranged and combined substantially as and for the purposes set forth.

In testimony that I claim the foregoing I have hereunto set my hand this 12th day of January, 1889.

LEWIS S. CHICHESTER.

Witnesses:
CHARLES H. PELL,
CONSTANCE H. BALDWIN.